Patented Nov. 18, 1952

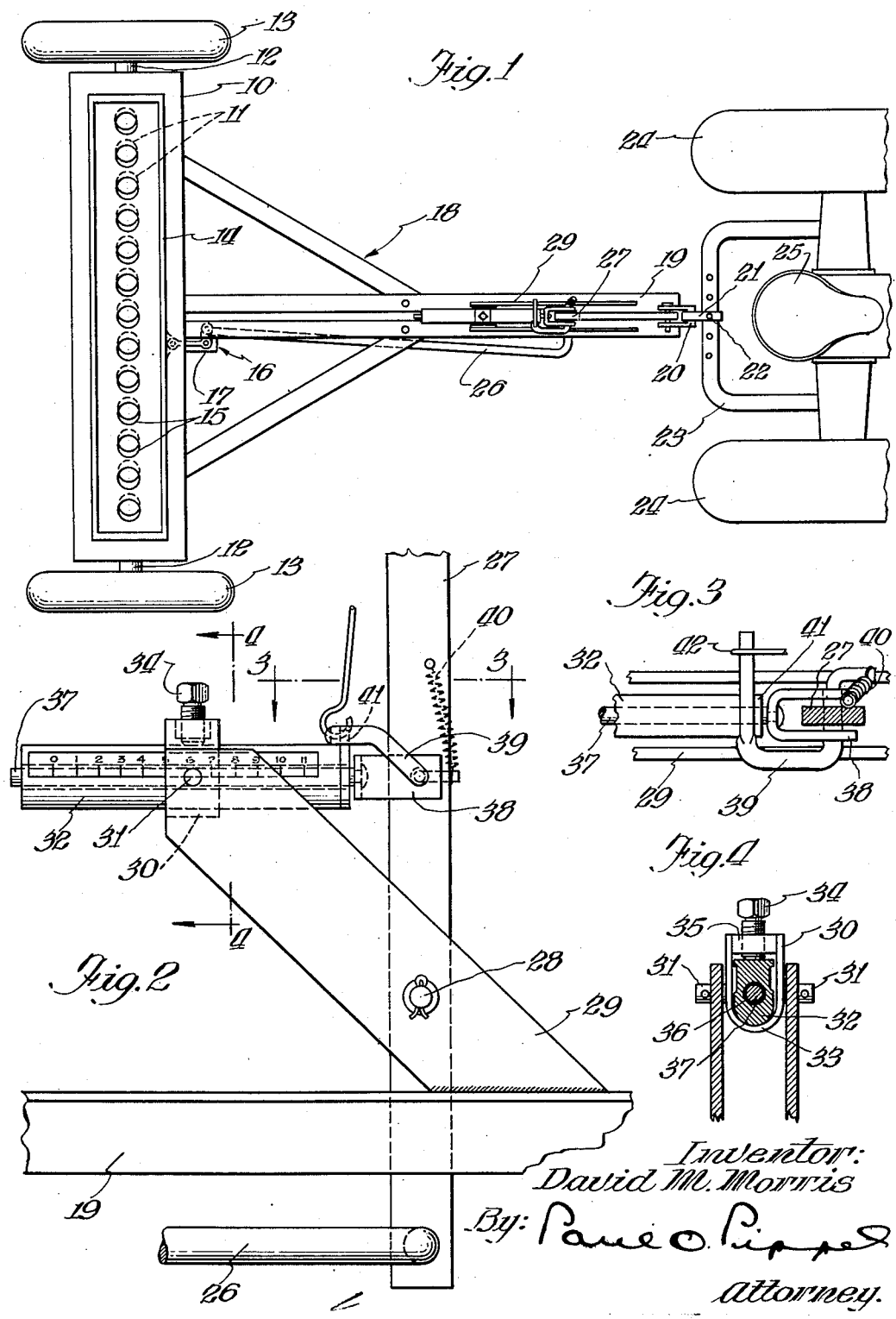

2,618,405

UNITED STATES PATENT OFFICE 2,618,405

ADJUSTING MECHANISM FOR MATERIAL DISCHARGE DEVICES

David M. Morris, Richmond, Ind., assignor to International Harvester Company, a corporation of New Jersey Application March 10, 1951, Serial No. 214,998

4 Claims. (Cl. 222—43)

This invention relates to agricultural implements and particularly to lime sowers and the like.

The conventional lime sower is a transversely extending box supported upon wheels and having a hitch frame for attachment to a tractor to be propelled thereby. The box is filled with lime and a plurality of openings are provided in the bottom of the box for dispensing the lime. A closure is provided for each opening which can be adjusted as desired to vary the size of the opening and, therefore, the amount of lime to be dispensed therefrom. It is customary to provide on the receptacle means for simultaneously opening, closing or adjusting all of the outlets. This adjustment is manual and is made at the box itself, so that when an adjustment is made the operator must stop and leave the tractor. When turning the machine at the end of a field the tractor operator finds it desirable from the standpoint of economy and to avoid needless waste of fertilizer, to close the discharge openings in the hopper box when the end of the field is reached and to reopen them after turning. However, it is time-consuming for the operator to dismount twice from the tractor at each end of the field to shut off and again open the discharge outlets, and it is an important object of this invention to provide improved adjusting mechanism for a lime sower whereby it is unnecessary for the tractor operator to stop the machine at each end of a field, thus effecting great savings in time and labor.

Another object of the invention is to provide in a trail-behind lime sower or the like, means actuated by the operator from his position thereon for opening and closing the fertilizer feed gates and returning them to the same position they occupied prior to closure, so that uniform amounts of fertilizer will be deposited at all times.

Other objects and advantages of the invention will become celar from the following detailed description when read in conjunction with the accompanying drawings, wherein:

Fig. 1 is a plan view of a trailing lime sower embodying the features of the present invention, with the cover removed;

Fig. 2 is an enlarged detail in side elevation of a portion of the structure shown in Fig. 1;

Fig. 3 is a sectional view on the line 3—3 of Fig. 2; and

Fig. 4 is a section on the line 4—4 of Fig. 2.

The invention will be described in its application to a trailing lime sower adapted to be propelled by a tractor. In Fig. 1 the lime sower is indicated as comprising a transversely extending elongated hopper 10 in which fertilizer is received and discharged through openings 11 in the bottom of the box. The box is mounted upon an axle 12 and supported upon wheels 13. The hopper is provided with a closure plate 14 indicated diagrammatically in Fig. 1, which is adapted to be moved transversely of the hopper and has openings 15 therein adapted to register with the openings 11. The plate or closure member 14 is movable to vary the size of the opening through which the lime may pass, and conventional closure operating means 16 is provided for moving the closure plate.

The closure operating means 16, it may be understood, comprises generally a bell-crank 17 pivoted upon a draw-frame 18 attached to the hopper and extending forwardly therefrom. This draw-frame comprises a pair of angle bars 19 having a U-shaped member 20 secured to its forward end to which is attached a clevis 21 pivotally connected by a pivot pin 22 to the draw-bar 23 of a tractor having laterally spaced drive wheels 24 and an operator's station 25.

As previously pointed out, it is important when turning a fertilizer distributor such as the lime sower described herein at the end of a field, that the discharge of fertilizer be stopped prior to making the turn and that it be resumed upon again beginning the traverse of the field. It is also highly important in order to assure uniformity of fertilization that the discharge openings be maintained of the selected size throughout the operation. This means that the closure control means 16 previously referred to must always move the closure member 14 to the same position upon recommencing the discharging operation. The setting of the discharge openings and the control thereof are accomplished by mechanism which includes a longitudinally extending rod 26 pivotally connected at its rear end to the bell-crank 17 and at its forward end to the lower end of a generally vertically extending manually operated lever 27 pivoted on a transverse axis at 28 upon a bracket 29 comprising laterally spaced members affixed as by welding to the angle bars 19. The lever 27 extends upwardly between the angle bars 19 and as may be noted in Fig. 1 is within reach of the operator from his station 25 on the tractor.

The bracket members 29 extend upwardly and rearwardly and a swivel 30 is pivotally mounted between the upper ends of the members 29 upon trunnions 31. As shown in Fig. 4, this swivel 30 is U-shaped and is adapted to slidingly receive therein an elongated indicator rack member 32, the lower portion of which is rounded to conform to the shape of the bight portion 33 of the swivel and the sides of which are provided with an offset portion having a graduated scale and numerals inscribed thereon, as indicated in Fig. 2.

The rack member 32 is slidable in the U-shaped swivel 30 and may be held in any adjusted position by a set screw 34 received in a threaded opening in a cap 35 forming a closure for the U-shaped member and welded to the sides thereof. The set screw 34 is adapted to engage the flattened upper face of the rack 32 and may be loosened, as desired, for adjustment of the rack in the swivel. Infinite increments of adjustment are thus obtainable.

Rack 32 is provided with an axial bore 36 in which is slidingly received a plunger 37 which extends entirely through the bore 36 and at its forward end is connected to a clip 38 pivotally mounted upon the transversely bent portion of a latch member 39 which passes through the lever 27 and has one end thereof connected to a spring 40 anchored to the lever 27, which biases the latch member 39 to a position as indicated in Fig. 2 in engagement with a lug 41 projecting somewhat above the upper face of the rack 32 and secured thereto. The latch 39 is in the form of a hook engaging the lug 41 and the latch is further connected by a rod 42 with conventional manually operable detent mechanism, not shown, carried on the lever 27, by which the latch 39 may be lifted as desired to permit movement of the lever 27 relative to the rack 32.

As should be clear from the drawings and particularly Fig. 2, the plunger 37 with its clip 38 forms a sliding guide member for the lever with respect to the indicator rack. The clip 38 further serves as an abutment adapted to engage the lug 41 at the end of rack 32 when the latch 39 is in its locking position.

Adjustment of the rack 32 in the swivel 30 according to the designations on the side of the rack is made according to the discharge opening desired in the fertilizer hopper. Then the lever 27 in its latched position with respect to the rack maintains this desired discharge opening. Upon turning the implement at the end of a field, when it is desired to close off the flow of fertilizer, the lever 27 is pulled back away from the rack 32 after releasing the latch 39 and may be held there until the turn is made. The lever is then allowed to return to a position for operation of the hopper, and the abutment 38 engages the rack 32 to insure the provision of discharge openings in the fertilizer hopper of uniform size regardless of how many times the openings are closed at the end of a field for turning and the closure member returned to its operating position.

It is believed that the operation of this novel control means for the fertilizer discharge mechanism of a lime sower or the like will be clearly understood from the foregoing description. It may further be understood that the invention is described in its preferred embodiment and that modifications may be made therein without departing from the spirit of the invention or the scope of the appended claims.

What is claimed is:

1. In a trailing material distributor adapted to be propelled by a tractor including a draw-frame, an elongated transversely extending hopper and a plurality of openings formed in the hopper for the discharge of material therefrom, closure means on the hopper for simultaneously opening and closing the material discharge openings, a lever pivoted on the draw-frame on a transverse axis and within reach of the tractor operator from his station thereon, an operating connection between the lever and said closure means, a sleeve member pivotally mounted on the draw-frame, an elongated indicator rack adjustably receivable in said sleeve and having an axial bore, an operating connection between said lever and said rack comprising a guide member carried by said lever having a plunger slidably receivable in said bore, stop means on the guide member engageable with the rack to limit movement of the lever and therefore the position of said closure means, and means for securing the rack in selected positions in said sleeve.

2. In a trailing material distributor adapted to be propelled by a tractor including a draw-frame, an elongated transversely extending hopper and a plurality of openings formed in the hopper for the discharge of material therefrom, closure means on the hopper for simultaneously opening and closing the material discharge openings, a lever pivoted on the draw-frame on a transverse axis and within reach of the tractor operator from his station thereon, an operating connection between the lever and said closure means, a sleeve member pivotally mounted on the draw-frame, an elongated indicator rack adjustably receivable in said sleeve and having an axial bore, an operating connection between said lever and said rack comprising a guide member carried by said lever having a plunger slidably receivable in said bore, stop means on the guide member engageable with the rack to limit movement of the lever and therefore the position of said closure means, means for securing the rack in selected positions in said sleeve, and releasable latching means on the rack and the lever cooperative to hold the lever and therefore the hopper discharge openings in adjusted position.

3. In a trailing material distributor adapted to be propelled by a tractor including a draw-frame, an elongated transversely extending hopper and a plurality of openings formed in the hopper for the discharge of material therefrom, closure means on the hopper for simultaneously opening and closing the material discharge openings, a lever pivoted on the draw-frame on a transverse axis and within reach of the tractor operator from his station thereon, an operating connection between the lever and said closure means, and adjustable means limiting the movement of the lever in one direction comprising a sleeve member carried by the draw-frame, an elongated indicator slidably receivable in the sleeve, means for adjusting the indicator relative to the sleeve to an extent corresponding to the desired hopper discharge opening, and a connection between the lever and the indicator including a plunger-like guide member carried by the lever, and a bore formed in said indicator to slidably receive said plunger, and releasable latch means on the lever engageable with cooperating means on the indicator upon engagement of the lever therewith.

4. In a trailing material distributor adapted to be propelled by a tractor comprising a draw-frame, an elongated transversely extending hopper and a plurality of openings formed in the hopper for the discharge of material therefrom, closure means on the hopper for simultaneously regulating the material discharge openings, a lever pivoted medially of its ends on the draw-frame on a transverse axis and within reach of the tractor operator from his station thereon, an operating connection between the lower end of the lever and said closure means, a bracket on the draw-frame extending upwardly therefrom and having a sleeve member pivotally mounted at its end, an elongated indicator rack slidably receivable in said sleeve and having an axial bore formed therethrough, means for securing the rack in said sleeve in selected positions relative thereto, and an operating connection between said lever and said rack comprising an abutment member carried by the lever engageable with one end of the rack to limit the movement of the lever in one direction, a plunger carried by the abutment member slidably receivable in said bore to guide the lever relative to the indicator rack, and latch means on the rack and the lever cooperative to releasably lock the lever to the rack.

DAVID M. MORRIS.

REFERENCES CITED

The following references are of record in the file of this patent:

UNITED STATES PATENTS

| Number | Name | Date |
|---|---|---|
| 1,327,455 | Willis et al. | Jan. 6, 1920 |
| 1,882,340 | Ryan | Oct. 11, 1932 |
| 2,245,152 | Masters | June 10, 1941 |